United States Patent [19]

Watanabe et al.

[11] 3,954,901

[45] May 4, 1976

[54] POLYESTER RESIN COMPOSITION

[75] Inventors: Toru Watanabe; Rinzo Ohno; Takashige Kato, all of Okazaki; Singo Sasaki, Ikazaki; Kunio Tsukamoto, Okazaki, all of Japan

[73] Assignee: Nippon Ester Co., Ltd., Okazaki, Japan

[22] Filed: Jan. 9, 1974

[21] Appl. No.: 431,992

[30] Foreign Application Priority Data

Jan. 11, 1973   Japan............................. 48-6230
Feb. 8, 1973   Japan............................. 48-15903
Mar. 24, 1973   Japan............................. 48-33885

[52] U.S. Cl.................... 260/850; 260/835; 427/195; 260/47 C
[51] Int. Cl.².................. C08L 61/28; C08L 63/00
[58] Field of Search............ 260/850, 47 C; 117/21; 427/195

[56] References Cited
UNITED STATES PATENTS

| | | | |
|---|---|---|---|
| 3,370,037 | 2/1968 | Giesen et al. | 260/47 C |
| 3,463,760 | 8/1969 | Barkey | 260/47 C |
| 3,502,620 | 3/1970 | Caldwell | 260/47 C |
| 3,515,696 | 6/1970 | Tsuji et al. | 260/47 C |
| 3,624,232 | 11/1971 | Van Dorp et al. | 260/850 |
| 3,759,854 | 9/1973 | Chang et al. | 260/850 |

*Primary Examiner*—John C. Bleutge
*Attorney, Agent, or Firm*—Sughrue, Rothwell, Mion, Zinn & Macpeak

[57] ABSTRACT

A polyester resin composition obtained by mixing a molten polyester having an average degree of polymerization ranging from about 5 to 50 mainly comprising a terephthalic acid unit, a p-hydroxybenzoic acid unit and an ethylene glycol unit, and one hardener selected from the group consisting of a diglycidyl compound, hexaalkoxymethylmelamine or the condensate thereof, and a blocked isocyanate, with the composition being suitable for the preparation of a powder paint. The thus produced polyester resin composition can be finely pulverized with ease, shows no blocking property, facilitates pigmentation and provides beautiful coatings excellent in weather resistance, solvent resistance, humidity resistance, antifouling property, and with intimate adhesiveness to metal.

5 Claims, No Drawings

POLYESTER RESIN COMPOSITION

BACKGROUND OF THE INVENTION

1. Field of the Invention

The present invention relates to a polyester resin composition which can be advantageously used in the preparation of a powder paint.

2. Description of the Prior Art

Powder paints have rapidly been developed in recent years because of their many advantages in that they do not cause environmental pollution as compared with the conventional solvent-type paints, that a coating of a thickness 40 – 300 $\mu$ can be formed by one coating, and that they can be recovered and reused, which leads to a marked increase in painting efficiency.

Usually, it is desirable for resins to have the following properties for preparing a powder paint:

1. easy pulverizability to a micro-powder;
2. a non-blocking property during transportation or storage;
3. sufficient fluidity at a relatively low temperature to facilitate pigmentation;
4. the capability of forming strong and beautiful coatings through baking at a low temperature for a short time; and
5. the capability of providing the coating with excellent properties including weather resistance, solvent resistance, antifouling property, intimate adhesiveness to metal, and the like.

Various materials have so far been examined as the material for a powder paint. However, an ideal material which can satisfy all of the above-described requirements has not yet been discovered.

SUMMARY OF THE INVENTION

As a result of intensive investigations to develop an ideal polyester resin composition for a powder paint utilizing the special characteristics obtained by a copolymerized terephthalic acid unit and a p-hydroxybenzoic acid unit without a deterioration of the excellent properties (including weather resistance, heat resistance, intimate adhesiveness to metal, etc.) of polyethylene terephthalate and polyethylene hydroxybenzoate, the inventors have attained the above-described objects.

That is, a polyester resin composition is prepared by mixing a polyester having an average degree of polymerization ranging from about 5 to 50 containing, as the main acid units about 40 to 80 mol% of terephthalic acid units, about 20 to 60 mol% of p-hydroxybenzoic acid units and about 0 to 30 mol% of saturated aliphatic dicarboxylic acid units and, as the main alcohol units, ethylene glycol units, and having free hydroxy and/or carboxy groups, and a hardener selected from the group consisting of a diglycidyl compound, a hexaalkoxymethylmelamine or a condensate thereof, and a blocked isocyanate.

This thermo-setting polyester resin compositions is formed into a powder paint and applied mainly to metal to obtain a hardened coating by baking. As a matter of course, the temperature employed for preparing a powder paint must be lower than the baking temperature.

DETAILED DESCRIPTION OF THE INVENTION

The term terephthalic acid unit as used in the present invention, is intended to cover those units represented by the formula

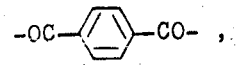

which are derived from terephthalic acid compounds. The term p-hydroxybenzoic acid unit as used is intended to cover those units represented by the formula

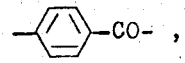

which are derived from p-hydroxybenzoic acid compounds. The term saturated aliphatic dicarboxylic acid unit as used herein is intended to cover those units represented by the formula $-OC-(CH_2)_n-CO-$ (wherein $n$ is an integer), which are derived from saturated aliphatic dicarboxylic acid compounds. Further, the term ethylene glycol unit as used herein is intended to cover those units represented by the formula $-OCH_2CH_2O-$ or $-OCH_2CH_2OH$, which are derived from ethylene glycol compounds.

Polyethylene terephthalate having an average degree polymerization ranging from about 5 to 50 shows a relatively high melting point of 230° to 260°C. Although polyethylene terephthalate per se provides many excellent properties, it is impossible to mix a polyethylene terephthalate having an average degree of polymerization ranging from about 5 to 50 and the hardener in a molten state without gellation, and also its pulverizability is poor.

As the method for reducing the melting point or softening point of polyethylene terephthalate, it is known to copolymerize a third component other than terephthalic acid and ethylene glycol. However, in most cases, the above-described method deteriorates the pulverizability and seriously increases the blocking property at temperatures less than 40°C, at which a powder paint is usually stored or applied. Therefore, it has been difficult to prepare a polyester which can be suitably used for a powder paint.

The inventors have discovered that by copolymerizing polyethylene terephthalate with about 20 to 60 mol%, preferably 22 to 45 mol%, of a p-hydroxybenzoic acid unit, the special effects as follows are obtained.

1. Excellent pulverizability is obtained.
2. The softening point is reduced so much as to facilitate pigmentation.
3. No blocking property is imparted even when the softening point is lowered.
4. Beautiful coatings can be obtained by baking a powder paint prepared therefrom.
5. Intimate adhesiveness to metal, especially iron, is improved.

Where an even more improved heat fluidity of the above-described copolymer is required, this characteristic can be obtained by further copolymerizing less than about 30 mol%, preferably 5 to 20 mol%, of an aliphatic dicarboxylic acid unit and/or less than about 50 mol%, preferably 20 to 40 mol%, of a dihydric alcohol unit other than ethylene glycol.

The above-described special effects can be maintained at the above specified copolymerization ratio.

A polyester having an average degree of polymerization ranging from about 5 to 50, preferably 10 to 30, comprising the polyester resin composition of the present invention is preferably prepared as follows. First, an ester interchange reaction is conducted using dimethyl terephthalate, methyl p-hydroxyethoxybenzoate and a dihydric alcohol unit mainly comprising ethylene glycol (the molar ratio of the acid component/glycol component is 1 to about 2) at about 150° to 250°C in the presence of a usual ester interchange reaction catalyst such as zinc acetate followed by methanol removal. Then, a polycondensation reaction is conducted using the products of the ester interchange reaction at about 200° to 280°C in the presence of a polycondensation catalyst such as antimony trioxide under reduced pressure to produce a high polymer having an intrinsic viscosity of not less than 0.4, preferably not less than 0.6, as measured in a mixed solvent of phenol/tetrachloroethane (1:1 by weight) at 20°C. The resulting high polymer is thereby depolymerized at about 200° to 280°C using one or more members selected from the group consisting of substantially non-volatile alcohols and/or substantially non-volatile esters (i.e., non-volatile at about 200° to 280°C) in an amount or amounts shown by the following formula depending upon the average degree of polymerization of the polyester desired.

$$\bar{x}_n = (a_o + a_1)/[(b_o + b_1) - (a_o + a_1)]$$

wherein
$\bar{x}_n$ is the desired average degree of polymerization;
$a_o$ is the number of moles of the acid component in the high polymer;
$a_1$ is the number of moles of the acid component to be added in the depolymerization reaction (with the aliphatic monocarboxylic acid not being calculated as a part of the acid component $a_o$);
$b_o$ is the number of moles of the alcohol component in the high polymer; and
$b_1$ is the number of moles of the alcohol component to be added in the depolymerization reaction.

Suitable alcohols having the above characteristics are trimethylol ethane, trimethylol propane, pentaerythritol, dipentaerythritol, mannitol, etc. Suitable esters are esters obtained by reacting a non-volatile alcohol with an aliphatic monocarboxylic acid having at least one alcoholic hydroxy group in its molecule, bis-β-hydroxyethyl terephthalate and/or β-hydroxyethyl p-hydroxyethoxybenzoate. The bis-β-hydroxyethyl terephthalate and β-hydroxyethyl p-hydroxyethoxybenzoate having 2 alcoholic hydroxy groups in its molecule are preferable non-volatile esters.

The substantially non-volatile alcohol or ester to be added in the depolymerization reaction is selected based on the following criteria:

1. Where a bifunctional hardener is used, polyhydric alcohols containing not less than three alcoholic hydroxy groups are added wholly or partially; and
2. Polyhydric alcohols containing not less than 3 alcoholic hydroxy groups are used in such amount to avoid a gellation of the polyester, depending upon the desired average degree of polymerization.

The degree of polymerization of the polyester greatly influences the properties of the polyester resin composition, especially its pulverizability and blocking resistance.

Therefore, by controlling the degree of polymerization of the polyester within the range of from about 5 to 50, preferably 10 to 30, favorable pulverizability and excellent blocking resistance can be imparted to the polyester resin composition. If the degree of polymerization is less than 5, it will be difficult to stably store and transport the powder paint due to its blocking property, while if the average degree of polymerization is more than about 50, the polymer cannot be pulverized to fine powder.

As the polyester to be used for the preparation of the polyester resin composition of the present invention, that prepared by depolymerizing a high polymer having an intrinsic viscosity of not less than 0.4 using a non-volatile alcohol and/or a non-volatile ester having at least one alcoholic hydroxy group in its molecule is preferable, as is described above. However, a polyester having an average degree of polymerization ranging from about 5 to 50 prepared by other processes than the above-described one, such as direct polymerization reaction or esterification reaction, can also be used.

Where a more improved heat fluidity of the above-described polyester is desired, such characteristic can be satisfied by further copolymerizing less than about 30 mol%, preferably 5 to 20 mol%, of an aliphatic dicarboxylic acid unit and/or less than about 50 mol%, preferably 20 to 40 mol%, of a dihydric alcohol unit other than ethylene glycol. The effects obtained by copolymerizing polyethylene terephthalate and about 20 to 60 mol%, preferably 22 to 45 mol%, p-hydroxybenzoic acid unit can be maintained at the above-specified copolymerization ratio.

As the aliphatic dicarboxylic acid unit copolymerizable with the polyester comprising the polyester resin composition of the present invention, suitable acids are succinic acid, adipic acid, azelaic acid, sebacic acid, etc., and, as the dihydric alcohol unit other than ethylene glycol, suitable alcohols are diethylene glycol, 1,2-propanediol, 1,3-propanediol, 1,3-butanediol, 1,4-butanediol, 1,6-hexanediol, cyclohexanedimethanol, neopentyl glycol, etc.

In the preparation of the polyester resin composition by mixing a molten polyester having an average degree of polymerization ranging from about 5 to 50 and the hardener, as such hardener, a hardener selected from the group consisting of a diglycidyl compound, hexaalkoxymethylmelamine or the condensate thereof, and a blocked isocyanate is used.

Where a blocked isocyanate is used as the hardener, the polyester resin composition is prepared by directly mixing a molten polyester having an average degree of polymerization ranging from about 5 to 50 with the blocked isocyanate at a temperature of less than 150°C, e.g., about 50 to 150°C, preferably 90° to 120°C.

Where hexaalkoxymethylmelamine or the condensate thereof is used as the hardener, it is preferable to mix a molten polyester having an average degree of polymerization ranging from about 5 to 50, whose terminal carboxy group content has been adjusted to less than 200 g.eq./ton, e.g., 10 to 200 g.eq./ton, preferably 50 to 150 g.eq./ton, and hexaalkoxymethylmelamine or the condensate thereof to thereby prepare the polyester resin composition.

A polyester having an average degree of polymerization ranging from about 5 to 50 whose terminal carboxy group content has been adjusted to less than 200 g.eq./ton can be obtained by adding an acid anhydride to the alcoholic hydroxy groups of the polyester having an average degree of polymerization ranging from about 5 to 50 but, particularly preferably, a polyester having an average degree of polymerization ranging from about 5 to 50, whose terminal carboxyl group content has been adjusted to less than 200 g.eq./ton is obtained by mixing a polyester, of which the carboxyl group content is at least 5% of the total terminal groups, obtained by adding an acid anhydride such as trimellitic anhydride, pyromellitic anhydride, phthalic anhydride, succinic anhydride, or the like to 5 to 100% of alcoholic hydroxy groups contained in the polyester having an average degree of polymerization ranging from about 5 to 50, and another polyester to which no acid anhydride has been added. The temperature at which the hardener is mixed into such a polyester is less than 150°C, preferably 90° to 120°C.

Where a diglycidyl compound is used as the hardener, the polyester resin composition is preferably prepared by mixing a molten polyester obtained by adding an acid anhydride such as trimellitic anhydride, pyromellitic anhydride, phthalic anhydride, succinic anhydride, or the like to more than 50% of alcoholic hydroxy groups contained in a polyester having an average degree of polymerization ranging from about 5 to 50, and the diglycidyl compound at temperatures of less than 150°C, preferably 90° to 120°C.

Where a diglycidyl compound is used as the hardener, the polyester resin composition is preferably prepared by mixing a molten polyester obtained by adding an acid anhydride such as trimellitic anhydride, pyromellitic anhydride, phthalic anhydride, succinic anhydride, or the like to more than 50% of alcoholic hydroxy groups contained in a polyester having an average degree of polymerization ranging from about 5 to 50, and the diglycidyl compound at temperatures of less than 150°C, preferably 90° to 120°C.

The blocked isocyanates which can be used for the preparation of the polyester resin composition of the present invention are obtained by mixing an isocyanate, such as polymethylenepolyphenylisocyanate, diphenylmethanediisocyanate, tolylenediisocyanate, triphenylmethanetriisocyanate, xylenediisocyanate, xylylenediisocyanate, isophoronediisocyanate, trimethylhexamethylenediisocyanate, hexamethylenediisocyanate or the like, and 0.9 to 2.0 equivalents of $\epsilon$-caprolactam or acetoxime. If the amount of $\epsilon$-caprolactam or acetoxime which is used for blocking the isocyanate is less than 0.9 equivalent, gellation occurs upon mixing the polyester and the blocked isocyanate, which makes the formation of a paint impossible. On the other hand, if the amount is more than 2.0 equivalents, the blocking resistance of the resulting polyester resin composition is seriously deteriorated. Therefore, the amount of $\epsilon$-caprolactam or acetoxime should be 0.9 to 2.0 equivalents, particularly preferably 1.0 to 1.2 equivalents.

As the diglycidyl compounds which can be used for the preparation of polyester resin composition of the present invention, those represented by the following general formula;

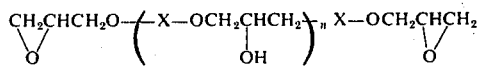

wherein X represents a divalent organic residue capable of forming ester bond or ether bond, and n represents an average number of 0 to 10.0, are preferable.

Specific examples of X are residues of bisphenol A, phthalic acid, isophthalic acid, terephthalic acid, a dihydric alcohol and the like.

As the hexaalkoxymethylmelamine which can be used for the preparation of the polyester resin composition of the present invention, those represented by the following general formula;

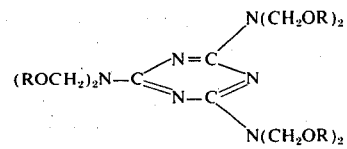

wherein R represents an alkyl group having not more than 6 carbon atoms such as a methyl, ethyl, n-butyl group or the like, preferably. The condensates thereof can also be suitably usable.

Where an blocked isocyanate is used as the hardener, the amount thereof which can be used for the preparation of polyester resin composition of the present invention is that which satisfies the following formula;

$$0.5 < \frac{N}{H} \leq 2.0$$

wherein N and H represent, respectively, the isocyanate group equivalents and the hydroxy group equivalents of the polyester resin composition. In the above N is equal to the value obtained by multiplying the number of moles of the blocked isocyanate to be mixed by the number of functional groups per one mole of the blocked isocyanate, and H is equal to the value obtained by subtracting the number of the carboxy groups from the total number of the terminal groups, the total number of the terminal groups being calculated from the mean molecular weight of the polyester resin composition, with the mean molecular weight being determined by the vapor pressure method using an apparatus for the determination of molecular weights, available from the Knauer Co.

Where the diglycidyl compound is used as the hardener, the amount thereof is that which satisfies the following formula;

$$\frac{E}{C} \leq 2.0$$

wherein E and C represent, respectively, the glycidyl group equivalents and the carboxy group equivalents of polyester resin composition. In the above E is equal to the value obtained by multiplying the number of moles of the diglycidyl compound to be mixed by 2. C is determined from a titration of a solution of the polyester resin composition using a 0.1N potassium hydroxide aqueous solution using a 1% by weight solution of phenolphthalein in dimethyl formamide as an indicator, the solution to be titrated being prepared by dissolving 0.5 g of the polyester resin composition in 50 ml of dimethyl formamide and then adding 5 me of distilled water to the resulting solution.

Where a hexaalkoxymethylmelamine or a condensate thereof is used as the hardener, it is used in such amount which satisfies the following formula;

$$0.5 < \frac{M}{H} \leq 2.0$$

wherein M and H represent, respectively, the alkoxy group equivalents and the hydroxy group equivalents of the polyester resin composition. In the above, M is equal to the value obtained by multiplying the number of moles of the hexaalkoxymethylmelamine or the condensate thereof to be mixed by the number of functional groups per one mole of the hexaalkoxymethylmelamine or the condensate thereof, and H is as described hereinbefore.

The range of the amount of the hardener specified by each of the foregoing formulae are designed to maintain the film property of the coatings formed by baking the powder paints obtained from the composition and to maintain the advantages of the polyester of the present invention. The kind and the amount of the hardener are so selected depending upon the use of polyester resin powder paint and the characteristics required for the use.

That is, in order to prepare a polyester resin composition having the various characteristics required for the resin to be used for powder paint, the following factors must be ideally combined:

a. kinds and amounts of acid component and alcohol component constituting polyester;
b. average degree of polymerization of the polyester;
c. control of the amount of hydroxy groups or carboxy groups to be reacted with the hardener; and
d. kind and amount of the hardener.

The present invention will now be illustrated in more detail by reference to the following Examples and Reference Examples. Unless otherwise indicated all percents, parts, ratios, and the like are by weight.

EXAMPLE 1

An ester interchange reaction was conducted using dimethyl terephthalate (hereinafter abbreviated as DMT), methyl p-hydroxyethoxybenzoate (hereinafter abbreviated as OEBM) and ethylene glycol (hereinafter abbreviated as EG) in the amounts given in Table 1 in the presence of 0.01 mol of zinc acetate as a catalyst. If necessary, one or more of adipic acid (hereinafter abbreviated as ADA), azelaic acid (hereinafter abbreviated as AZA), sebacic acid (hereinafter abbreviated as SEA), neopentyl glycol (hereinafter abbreviated as NPG), diethylene glycol (hereinafter abbreviated as DEG) and 1,4-butanediol (hereinafter abbreviated as 1,4-BD) were added thereto, and the esterification reaction was conducted to prepare a low molecular weight polyester composition.

Subsequently, 0.01 mol of triphenyl phosphite and 0.02 mol of antimony trioxide were added thereto and polycondensation reaction was conducted under a reduced pressure of 0.5 mmHg at 270°C to prepare the highly polymerized polyesters shown in Table 2.

Table 2

| No. | Intrinsic Viscosity | Amount of Terminal Carboxyl Groups (g.eq./$10^6$ g) |
|---|---|---|
| 1 | 0.65 | 21.5 |
| 2 | 0.68 | 20.8 |
| 3 | 0.70 | 19.3 |
| 4 | 0.68 | 22.8 |
| 5 | 0.68 | 19.0 |
| 6 | 0.69 | 17.5 |
| 7 | 0.68 | 20.7 |
| 8 | 0.72 | 19.1 |
| 9 | 0.70 | 21.2 |
| 10 | 0.71 | 20.4 |
| 11 | 0.70 | 20.1 |
| 12 | 0.55 | 16.3 |
| 13 | 0.54 | 16.8 |
| 14 | 0.73 | 24.3 |
| 15 | 0.72 | 15.6 |
| 16 | 0.64 | 16.0 |

Subsequently, to each of the highly polymerized polyesters given in Table 2 were added one or more of bis-β-hydroxyethyl terephthalate (hereinafter abbreviated as BHET), β-hydroxyethyl p-hydroxyethoxybenzoate (hereinafter abbreviated as OEBG), the ester obtained by reacting pentaerythritol with stearic acid (molar ratio of pentaerythritol/stearic acid = ½, the ester being abbreviated as PEST, hereinafter), trimethylol propane (hereinafter abbreviated as TP) and pentaerythritol (hereinafter abbreviated as PE), in the amounts set forth in Table 3, and depolymerization was conducted under atmospheric pressure at 270°C to prepare the polyesters shown in Table 4.

Table 3

| No. | BHET | OEBG | PEST | TP | PE |
|---|---|---|---|---|---|
| 1 | 8.00 | | | | 5.33 |
| 2 | 4.50 | 3.50 | | | 5.33 |
| 3 | 2.00 | | | 1.80 | 1.20 |
| 4 | | | | 4.40 | 0.60 |
| 5 | | | | 4.40 | 0.60 |
| 6 | | | | 4.40 | 0.60 |
| 7 | 6.00 | | | | 4.00 |
| 8 | | | 3.33 | | |
| 9 | | | | 4.40 | 0.60 |
| 10 | | | | 4.40 | 0.60 |
| 11 | | | | 4.40 | 0.60 |
| 12 | 6.00 | 6.00 | | | 6.18 |
| 13 | 3.00 | 3.00 | | | 4.00 |
| 14 | | | | 3.80 | 0.20 |
| 15 | 2.00 | 2.00 | | | |
| 16 | 1.00 | 1.00 | 1.33 | | |

Table 4

| No. | Average Degree of Polymerization Calcd. | Average Degree of Polymerization Found | Terminal Groups* Carboxyl Groups | Terminal Groups* Hydroxyl Groups | Softening Point (°C) |
|---|---|---|---|---|---|
| 1 | 7.5 | 7.3 | 0.86 | 37.21 | 75 |

Table 1

| Starting Material | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| DMT | 48 | 52 | 43 | 56 | 56 | 56 | 50 | 56 | 56 | 56 | 56 | 50 | 53 | 56 | 48 | 49 |
| OEBM | 44 | 40 | 35 | 38 | 38 | 38 | 44 | 34 | 34 | 34 | 34 | 38 | 41 | 24 | 38 | 39 |
| ADA | | | 10 | 6 | | | | | 10 | | | | | 20 | | |
| AZA | | | | | 6 | | | 10 | | 10 | | | | | | |
| SEA | | | 10 | | | 6 | | | | | 10 | | | | 10 | 10 |
| EG | 140 | 104 | 121 | 162 | 162 | 162 | 124 | 146 | 126 | 126 | 126 | 58 | 67 | 136 | 114 | 117 |
| NPG | | 40 | 40 | | | | | 20 | 40 | 40 | 40 | 40 | 40 | 40 | 40 | 40 |
| DEG | | | | | | | 20 | | | | | | | | | |
| 1,4-BD | | | | | | | | | | | | 40 | 40 | | | |

Table 4-continued

| No. | Average Degree of Polymerization | | Terminal Groups* | | Softening Point |
|---|---|---|---|---|---|
| | Calcd. | Found | Carboxyl Groups | Hydroxyl Groups | |
| 2 | 7.5 | 7.3 | 0.84 | 37.23 | 75 |
| 3 | 20.0 | 19.0 | 0.92 | 13.80 | 70 |
| 4 | 20.0 | 19.2 | 0.86 | 15.16 | 80 |
| 5 | 20.0 | 19.2 | 0.82 | 15.20 | 80 |
| 6 | 20.0 | 19.3 | 0.82 | 15.14 | 80 |
| 7 | 10.0 | 9.6 | 0.90 | 27.94 | 70 |
| 8 | 30.0 | 28.4 | 0.88 | 6.16 | 85 |
| 9 | 20.0 | 19.5 | 0.96 | 14.90 | 75 |
| 10 | 20.0 | 19.4 | 0.90 | 15.00 | 75 |
| 11 | 20.0 | 19.1 | 0.92 | 15.16 | 75 |
| 12 | 5.5 | 5.3 | 0.88 | 49.22 | 70 |
| 13 | 10.0 | 9.6 | 0.95 | 27.89 | 75 |
| 14 | 25.0 | 24.2 | 0.76 | 11.70 | 65 |
| 15 | 25.0 | 24.3 | 0.82 | 7.42 | 75 |
| 16 | 30.0 | 28.1 | 0.81 | 6.31 | 85 |

*g.eq./100 mols acid component

EXAMPLE 2

A diisocyanate or polyisocyanate and ε-caprolactam or acetoxime were mixed with each other in the amounts given in Table 5 at 80°C to prepare blocked isocyanates.

Table 5

| No. | Isocyanate | | Blocking Agent | | Equivalent Ratio* |
|---|---|---|---|---|---|
| | Name | Amount | ε-Caprolactam | Acetoxime | |
| | | (Mols) | (Mols) | (Mols) | |
| I | Diphenylmethane-diisocyanate | 50 | 100 | | 1.00 |
| II | Triphenyl-methane-triisocyanate | 50 | 150 | | 1.00 |
| III | Tolylene-diisocyanate | 50 | 120 | | 1.20 |
| IV | Trimethylene-triphenyliso-cyanate | 50 | | 165 | 1.10 |
| V | Hexamethylene-diisocyanate | 50 | 95 | | 0.95 |

*The ratio of number of moles of the blocking agent/equivalent number of isocyanate.

Subsequently, each of polyester Nos. 1, 2, 3, 4, 5 and 8, prepared in Example 1 and the blocked isocyanate in an amount given in Table 6 at 100°C were mixed to prepare the polyester resin compositions shown in Table 6.

Table 6

| No. | Blocked Isocyanate | | | | $\frac{N^*}{H}$ |
|---|---|---|---|---|---|
| Resin Composition | Polyester | No. | Mixed Amount | Softening Point | |
| | | | (Mols) | (°C) | |
| U-1 | 1 | I | 20.0 | 70 | 1.07 |
| U-2 | 2 | V | 17.5 | 70 | 0.94 |
| U-3 | 3 | II | 5.0 | 70 | 1.09 |
| U-4 | 4 | III | 7.5 | 75 | 0.99 |
| U-5 | 5 | III | 7.5 | 75 | 0.99 |
| U-6 | 8 | IV | 2.5 | 85 | 1.22 |

*N and H represent, respectively, the isocyanate group equivalent and the hydroxy group equivalents of the polyester resin composition.

When each of the above-described polyester resin composition was pulverized using a Micron Victory Mill VP-1 type pulverizer, produced by Hosokawa Tekkosyo Co., Ltd., Japan, the feed of the pulverized powder at a rate of more than 35 kg/hr was realized in every case. Thus, every composition was pulverized into fine powder particles, of wich more than 95% passed a 150-mesh sieve. Subsequently, a 0.8 mm × 100 mm × 200 mm steel plate was subjected to electrostatic coating using the powder particles which passed a 150-mesh sieve to provide a coating of a thickness of 100 μ. Upon baking at 180°C for 30 minutes, a beautiful coating was formed, which was then subjected to the following tests to obtain the results shown in Table 7.

| (1) | Impact Test: | ½″ - 1 kg (Du Pont impact tester) |
|---|---|---|
| (2) | Erichsen Test: | According to JIS Z 2247 |
| (3) | Specular Reflection at 60°: | According to JIS Z 8741 |
| (4) | Heat Resistance Test: | According to JIS K 6902 |
| (5) | Boiling Resistance Test: | After processing according to JIS K 6902, the sample was subjected to the Erichsen test. |
| (6) | Antifouling Test: | According to JIS K 6902 |
| (7) | Acetone Resistance Test: | Conducted according to JIS K 6911 |
| (8) | Weather Resistance: | After exposing to the atmosphere outdoor for 1 year, the specular reflection of the sample was examined. |

Additionally, none of the powders underwent blocking when stored at 40°C for 7 days.

Table 7

| Evaluation | Resin Composition No. | | | | | |
|---|---|---|---|---|---|---|
| | U - 1 | U - 2 | U - 3 | U - 4 | U - 5 | U - 6 |
| Impact Test | 50 cm | 50 cm | >50 cm | >50 cm | >50 cm | >50 cm |
| Erichsen Test | >9 mm | >9 mm | >9 mm | >9 mm | >9 mm | >9 mm |
| Specular Reflection at 60° | 98 % | 98 % | 96 % | 97 % | 97 % | 98 % |
| Heat Resistance | good | good | good | good | good | good |
| Boiling Resistance | >9 mm | >9 mm | >9 mm | >9 mm | >9 mm | >9 mm |
| Antifouling Test | good | good | good | good | good | good |
| Acetone Resistance | good | good | good | good | good | good |
| Weather Resistance | 95 % | 96 % | 94 % | 94 % | 94 % | 96 % |

EXAMPLE 3

To each of the polyester Nos. 7, 12, 13 and 14 prepared in Example 1 was added trimellitic anhydride (hereinafter abbreviated as TMAD) at 130°C in an amount given in Table 8. Subsequently, an epichlorohydrin-bisphenol type epoxy resin (hereinafter abbreviated as BDG; epoxy equivalent: 245) and diglycidyl phthalate (hereinafter abbreviated as PDG; epoxy equivalent: 150) were mixed thereinto at 100°C to prepare polyester resin compositions given in Table 8.

Table 8

| No. | Polyester | TMAD | Epoxy Resin | | Softening Point | $\frac{E^*}{C}$ |
|---|---|---|---|---|---|---|
| Resin Composition | | | BDG | PDG | | |
| | | (Mols) | (Mols) | (Mols) | (°C) | |
| E - 1 | 7 | 15 | 10 | | 70 | 0.65 |
| E - 2 | 12 | 20 | 7.5 | 15 | 70 | 1.10 |
| E - 3 | 13 | 15 | | 15 | 70 | 0.97 |
| E - 4 | 14 | 10 | 7.5 | | 65 | 0.72 |

*E and C represent, respectively, the glycidyl group equivalents and the carboxy group equivalents of the polyester resin composition.

When each of the above-described polyester resin compositions was pulverized in the same manner as described in Example 2, a feed of the pulverized powder at a rate of more than 50 kg/hr was realized in every case. Thus, every composition was pulverized into fine powder particles of which more than 95% passed a 150-mesh sieve.

Subsequently, electrostatic coating ws conducted in the same manner as described in Example 2. Upon baking at 200°C for 20 minutes, a beautiful coating was formed, which was then subjected to the same coating tests as described in Example 2 to obtain the following results shown in Table 9.

Table 9

| Evaluation | Resin Composition No. | | | |
|---|---|---|---|---|
| | E - 1 | E - 2 | E - 3 | E - 4 |
| Impact Test | 30 cm | 30 cm | 30 cm | 50 cm |
| Erichsen Test | >9 mm | >9 mm | >9 mm | >9 mm |
| Specular Reflection at 60° | 95% | 95% | 97% | 98% |
| Heat Resistance | good | good | good | good |
| Boiling Resistance | >9 mm | >9 mm | >9 mm | >9 mm |
| Antifouling Test | good | good | good | good |
| Acetone Resistance | good | good | good | good |
| Weather Resistance | 91% | 91% | 92% | 94% |

Table 9-continued

| Evaluation | Resin Composition No. | | | |
|---|---|---|---|---|
| | E - 1 | E - 2 | E - 3 | E - 4 |
| Resistance | | | | |

EXAMPLE 4

12 Mols of TMAD was added at 130°C to polyester No. 6 prepared in Example 1 to thereby prepare a polyester having an acid value of 65.3. Subsequently, the thus prepared polyester and each of polyester Nos. 9, 10, 11, 15 and 16 prepared in Example 1 were mixed at 100°C so that the resulting polyesters had the acid values shown in Table 10. After adjusting the acid value, each of the polymers and hexamethoxymethylmelamine (hereinafter abbreviated as HMM) or hexabutoxymethylmelamine (hereinafter abbreviated as HBM) in the amount shown in Table 10 were mixed at 90°C to thereby prepare the polyester resin compositions shown in Table 10.

Table 10

| No. | Polyester | Acid Value* | Hexaalkoxymethylmelamine | | Softening Point | $\frac{M^{**}}{H}$ |
|---|---|---|---|---|---|---|
| Resin Composition | | | HMM | HBM | | |
| | | | (Mols) | (Mols) | (°C) | |
| M - 1 | 9 | 4 | 2.5 | | 70 | 1.00 |
| M - 2 | 10 | 4 | 2.5 | | 70 | 1.00 |
| M - 3 | 11 | 4 | | 2.5 | 70 | 0.99 |
| M - 4 | 15 | 6 | | 1.5 | 75 | 1.21 |
| M - 5 | 16 | 5 | 1.2 | | 85 | 1.14 |

*an acid value of 1 corresponds to 17.83 g.eq. carboxyl groups/ton
**M and H represent, respectively, the alkoxy group equivalents and the hydroxy group equivalents of the polyester resin composition.

Subsequently, the above-described polyester resin compositions were pulverized in the same manner as described in Example 2. In every case, a feed of pulverized powder at a rate of more than 35 kg/hr was realized. Thus, every composition was pulverized into fine powder particles, of which more than 95% passed a 150-mesh sieve.

Successively, electrostatic coating was conducted in the same manner as described in Example 2. Upon baking at 170°C for 20 minutes, a beautiful coating was formed, which was then subjected to the same coating tests as described in Example 2 to obtain the results shown in Table 11.

Table 11

| Evaluation | Resin Composition No. | | | | |
|---|---|---|---|---|---|
| | M - 1 | M - 2 | M - 3 | M - 4 | M - 5 |
| Impact Test | >50 cm | >50 cm | >50 cm | >50 cm | >50 cm |
| Erichsen Test | >9 mm | >9 mm | >9 mm | >9 mm | >9 mm |
| Specular Reflection at 60° | 95% | 95% | 95% | 96% | 97% |
| Heat Resistance | good | good | good | good | good |
| Boiling Resistance | >9 mm | >9 mm | >9 mm | >9 mm | >9 mm |
| Antifouling Test | good | good | good | good | good |
| Acetone Resistance | good | good | good | good | good |
| Weather Resistance | 94% | 94% | 94% | 94% | 95% |

For polyester resin composition M - 1, samples were removed at random from 10 points after pulverizing the resin composition, and the acid value of each sample was measured. The results thus obtained are as follows.
3.96, 4.01, 4.02, 4.05, 3.98, 3.99, 3.98, 3.95, 4.00, 4.02
Average Value: 3.996
Estimated Value of the Standard Deviation: 0.029

EXAMPLE 5

An ester interchange reaction was conducted in the same manner as described in Example 1 using 56 mols of DMT, 44 mols of OEBM, 136 mols of EG, and 5.33 mols of PE. Then, a polycondensation reaction was conducted under a reduced pressure of 0.5 mmHg at a reaction temperature of 230°C for 20 or 25 minutes to prepare polyesters. Thus, the results shown in Table 12 were obtained.

Table 12

| Polycondensation Time (min) | Average Degree of Polymerization | Terminal Groups* | | Softening Point |
|---|---|---|---|---|
| | | Carboxyl Groups | Hydroxyl Groups | |
| | | | | (°C) |
| 20 | 6.3 | 0.48 | 41.92 | 70 |
| 25 | 8.9 | 0.55 | 32.59 | 75 |

*g.eq/100 mols acid component

Polyester resin compositions were prepared from the thus obtained polyesters according to the process described in Examples 2, 3 and 4. The resulting compositions showed good pulverizability and feed properties and, upon electrostatic coating and subsequent baking, beautiful coatings were formed. The results of the tests on the coatings were excellent.

Reference Example 1

An ester interchange reaction was effected in the same manner as described in Example 1 using 56 mols of DMT, 44 mols of OEBM and 136 mols of EG. Thereafter, a polycondensation reaction was conducted under a reduced pressure of 0.5 mmHg at a reaction temperature of 270°C to thereby obtain the highly polymerized polyesters shown in Table 13.

Table 13

| No. | Intrinsic Viscosity | Terminal Carboxyl Group |
|---|---|---|
| | | (g.eq./$10^6$ g) |
| 1 | 0.65 | 20.8 |
| 2 | 0.66 | 21.1 |
| 3 | 0.65 | 21.0 |

Subsequently, 8.00 mols of EG and 5.33 mols of PE were added to each of the above-described highly polymerized polyesters, and depolymerization was conducted under atmospheric pressure at 270°C to obtain the polyesters shown in Table 14.

Table 14

| No. | Average Degree of Polymerization | | Terminal Group* | | Softening Point |
|---|---|---|---|---|---|
| | Calcd. | Found | Carboxyl Groups | Hydroxyl Groups | |
| | | | | | (°C) |
| 1 | 7.5 | 9.2 | 0.84 | 31.56 | 80 |
| 2 | 7.5 | 7.7 | 0.86 | 35.78 | 75 |
| 3 | 7.5 | 8.9 | 0.86 | 32.28 | 75 |

*g.eq/100 mols acid component

From the results shown in Table 14, it can be seen that, when an alcohol which is volatile at 270°C such as EG is used, the amount of alcohol component consumed for depolymerization varies so much that the average degree of polymerization cannot be controlled with accuracy.

Reference Example 2

An ester interchange reaction was conducted in a miniature apparatus, 1/100 the size of that used in the Examples, using 0.7 mol of DMT and 1.4 mols of EG in the presence of $7 \times 10^{-5}$ mol of zinc acetate as a catalyst. Subsequently, 0.3 mol of ADA and 0.6 mol of EG were added thereto to conduct an esterification reaction. Then, $2 \times 10^{-4}$ mol of triphenylphosphite and $2 \times 10^{-4}$ mol of antimony trioxide were added thereto to conduct a polycondensation in the same manner as described in Example 1. Thus, a highly polymerized polyester having an intrinsic viscosity of 0.66, and terminal carboxyl groups of 24.3 g.eq./$10^6$ g can be obtained. Thereafter, 0.044 mol of TP and 0.006 mol of PE were added thereto and a depolymerization reaction was conducted at 270°C. Thus, a polyester was prepared whose calculated average degree of polymerization was 20.0, found average degree of polymerization 19.4, terminal carboxyl groups 0.0091 g.eq./mol acid component, terminal hydroxy groups 0.1499 g.eq./mol acid component, and softening point 75°C.

The polyester having an acid value of 65.3 prepared in Example 4 and the above-described polyester were mixed at 100°C so that the acid value was adjusted to 4.0. Then, 0.03 mol of hexamethoxymethylmelamine was mixed therewith at 90°C to prepare a polyester resin composition. This polyester resin composition had a softening point of 75°C and an M/H ratio of 1.20. However, it showed a serious blocking property at room temperature and was absolutely impossible to pulverize to fine powder.

Reference Example 3

Diphenylmethanediisocyanate and ε-caprolactam were mixed at 80°C in amounts shown in Table 15 to prepare blocked isocyanates.

Table 15

| No. | Diphenylmethane-diisocyanate | -Caprolactam | Equivalent Ratio |
|---|---|---|---|
| VI | 0.5 mol | 3.0 mol | 3.00 |
| VII | 0.5 | 0.8 | 0.80 |

A polyester having the same composition and the same polymerization degree as polyester No. 1 shown in Example 1 was prepared using a 1/100 scale miniature apparatus. Then, the above-described blocked isocyanate was mixed therewith at 100°C in the amount shown in Table 16 to thereby prepare polyester resin compositions as shown in Table 16.

Table 16

| Resin Composition No. | Blocked Isocyanate No. | Mixed Amount (Mol) | Softening Point (°C) | N/H |
|---|---|---|---|---|
| U - 7 | VI | 0.2 | 65 | 1.07 |
| U - 8 | VII | 0.2 | — | — |

Polyester resin composition U - 7 showed a serious blocking property at room temperature and could not be pulverized into a fine powder.

Polyester resin composition U - 8 underwent gellation during the preparation thereof and the melt viscosity was increased so much that stirring had to be stopped. Thus, this composition could not be formed into a paint.

Reference Example 4

A polyester having the same composition and the same degree of polymerization as polyester No. 4 described in Example 1 was prepared using a 1/100 scale miniature apparatus.

Subsequently, the blocked isocyanate III prepared in Example 2 was mixed therewith at 100°C in an amount shown in Table 17 to thereby prepare polyester resin compositions.

Table 17

| Resin Composition No. | Blocked Isocyanate No. | Mixed Amount (Mol) | Softening Point (°C) | N/H |
|---|---|---|---|---|
| U - 9 | III | 0.20 | 70 | 2.64 |
| U - 10 | III | 0.03 | 80 | 0.40 |

Of the above-described polyester resin compositions, U - 9 showed a blocking property at room temperature and was a somewhat difficult to pulverize into a fine powder.

U - 9 was cooled with dry ice followed by pulverizing. Then, baking was conducted under the same conditions as described in Example 2 to evaluate the properties of the coatings. Thus, the results shown in Table 18 were obtained.

Table 18

| Evaluation | Resin Composition No. | |
|---|---|---|
| | U - 9 | U - 10 |
| Impact Test | 10 cm | >10 cm |
| Erichsen Test | 3 mm | 1 mm |
| Specular Reflection at 60° | 96% | 97% |
| Heat Resistance | bad | bad |
| Boiling Resistance | 0 mm | 0 mm |
| Antifouling Test | bad | bad |
| Acetone Resistance | bad | bad |
| Weather Resistance | — | — |

Reference Example 5

A polyester having the same composition and the same degree of polymerization as polyester No. 14 prepared in Example 1 was prepared using a 1/100 scale miniature apparatus.

Subsequently, 0.1 mol of TMAD was added thereto at 130°C, and 0.3 mol of BDG was then mixed therewith at 100°C to thereby prepare a polyester resin composition whose softening point and E/C ratio were 55°C and 2.89, respectively.

The thus obtained polyester resin composition showed a slight blocking property and was a little difficult to pulverize. This composition was pulverized after cooling with dry ice and was then baked under the same conditions as described in Example 3. The properties of the formed coating were evaluated to obtain the following results.

| Impact Resistance: | 10 cm |
|---|---|
| Erichsen Test: | 3 mm |

Reference Example 6

A polyester having the same composition and the same degree of polymerization as polymer No. 9 of Example 1 was prepared using a 1/100 scale miniature apparatus.

Subsequently, TMAD was added thereto at 130°C to adjust the acid value to 4. Then, hexamethoxymethylmelamine was mixed therewith in an amount given in Table 19 to thereby prepare polyester resin compositions.

Table 19

| Resin Composition No. | Acid Value | HMM (Mol) | Softening Point (°C) | M/H |
|---|---|---|---|---|
| M - 6 | 4 | 0.075 | 65 | 3.00 |
| M - 7 | 4 | 0.012 | 75 | 0.48 |

Polyester resin composition M - 6 showed a slight blocking property at room temperature and was difficult to pulverize into a fine powder. However, after cooling with dry ice, it was pulverized and was baked under the same conditions as described in Example 4. The properties of the coating were evaluated to obtain the results shown in Table 20.

Table 20

| Evaluation | Resin Composition No. | |
|---|---|---|
| | M - 6 | M - 7 |
| Impact Test | 20 cm | 10 cm |
| Erichsen Test | 4 mm | 2 mm |

For polyester resin composition M - 7, 10 samples were removed at random and the acid value of each sample was measured. Thus, the following results were obtained.
Acid Value: 3.57, 3.81, 4.75, 5.01, 4.12, 4.36, 3.13, 3.99, 4.24, 4.05
Average Value: 4.013
Estimated Value of Standard Deviation: 0.516

Reference Example 7

Polyesters having the same composition as the polyester No. 15 in Example 1 and having an average degree of polymerization of 3.5 or 65 were prepared using a 1/100 scale miniature apparatus.

A polyester having an average degree of polymerization of 3.5 was difficult to pulverize into a fine powder due to its serious blocking property.

On the other hand, a polyester having an average degree of polymerization of 65 was so strong that it could not be pulverized into fine powder particles of less than 150 mesh in size.

Reference Example 8

A polyester having the same composition and the same degree of polymerization as polyester No. 9 in Example 1 was prepared using a 1/100 scale miniature apparatus.

Subsequently, TMAD was added thereto at 130°C to adjust the acid value of 15 (corresponding to 267 g.eq./ton calculated as the carboxyl group amount), and 0.025 mol of hexamethoxymethylmelamine was mixed therewith at 90°C to prepare polyester resin composition. (The M/H ratio of the resulting polyester resin composition was 1.00)

When baking was conducted under the same conditions as described in Example 4, after pulverizing the composition, innumerable fine pores were formed in the resulting coating, and a smooth, beautiful coating was not obtained.

A comparison of the compositions of the Examples with those of the Reference Examples clearly demonstrates that the polyester resin composition of the present invention is extremely advantageous as a vehicle for a powder paint and can be stably produced on an industrial scale.

That is, as is clear from comparison of Example 1 with Reference Example 1, the process of depolymerizing a polyester using a substantially non-volatile alcohol and/or a substantially non-volatile ester shows an extremely excellent effect for controlling the average degree of polymerization of the polyester which greatly influences the pulverizability and blocking resistance of the polyester resin composition.

As is clear from a comparison of Example 4 with Reference Example 2, where adipic acid or a like aliphatic acid component alone is used without using p-hydroxybenzoic acid component, to improve heat-fluidity, a serious blocking property appears at the same time. 20 to 60 Mol% p-hydroxybenzoic acid is an indispensable component for improving the heat-fluidity without reducing pulverizability and blocking resistance.

As is clear from a comparison of Example 2 with Reference Example 3, if the amount of ε-caprolactam or acetoxime, which blocks the isocyanate, is less than 0.9 equivalent, gellation occurs upon mixing with a hardener, while if the amount is more than 2.0 equivalents, the properties of the polyester resin composition, especially the blocking resistance, are deteriorated.

As is clear from a comparison of Examples 2, 3 and 4 with Reference Examples 4, 5 and 6, in order to prepare polyester resin composition having excellent coating properties, the amount of the hardener to be mixed therewith must be selected in the range given by the foregoing formulae based upon the content of hydroxy groups or carboxyl groups in the polyester.

As is clear from a comparison of Example 4 with Reference Example 6, in the preparation of polyester resin composition using hexaalkoxymethylmelamine or the condensate thereof as a hardener, the acid value can be controlled uniformly within a very small range only by mixing the polyester obtained by adding a polycarboxylic anhydride to the alcoholic hydroxy groups contained in the polyester, and a polycarboxylic anhydride-free polyester.

As is clear from a comparison of Example 1 with Reference Example 7, it is necessary to control the average degree of polymerization of the polyester polymer within the range of 5 to 50 so as to use the polyester resin composition as the vehicle for a powder paint.

Also, as is clear from a comparison of Example 4 with Reference Example 8, where a hexaalkoxymethylmelamine or the condensate thereof is used as a hardener, it is preferable to control the content of carboxyl groups contained in the polyester resin composition to less than 200 g.eq./ton so as to prepare a polyester resin composition for a powder paint capable of forming smooth and beautiful coating.

While the invention has been described in detail and with reference to specific embodiments thereof, it will be apparent to one skilled in the art that various changes and modifications can be made therein without departing from the spirit and scope thereof.

What is claimed is:
1. A polyester resin composition for a powder paint, which is obtained by mixing a molten polyester having an average degree of polymerization ranging from about 5 to 50 and a hexaalkoxymethylmelamine or a condensate thereof as a hardener, said polyester being prepared by depolymerizing a highly polymerized polyester having an intrinsic viscosity of not less than 0.4 using a substantially non-volatile alcohol and/or a substantially non-volatile ester, said non-volatile alcohol or ester being non-volatile at about 200°–280°C, said substantially non-volatile alcohol being a polyhydric alcohol having 3 or more hydroxy groups, and said substantially non-volatile ester being the esterification product between said non-volatile polyhydric alcohol and an aliphatic monocarboxylic acid having at least one alcoholic hydroxy group in its molecule, or bis-β-hydroxyethyl terephthalate and/or β-hydroxyethyl p-hydroxyethoxybenzoate, and having as the main acid units, about 40 to 80 mol% of terephthalic acid units, about

20 to 60 mol% of p-hydroxybenzoic acid units and about 0 to 30 mol% of aliphatic dicarboxylic acid units and, as the main alcohol units, ethylene glycol units, and having free hydroxy and/or carboxy groups wherein the amount of said hexaalkoxymethylmelamine or the condensate thereof satisfies the following relationship;

$$0.5 < \frac{M}{H} \leq 2.0$$

wherein M and H represent, respectively, the alkoxy group equivalents and the hydroxy group equivalents of said polyester resin composition.

2. The polyester resin composition for a powder paint as described in claim 1, wherein said polyester is a polyester having a terminal carboxyl group content ranging from 50 to 200 g.eq./ton.

3. The polyester resin composition for a powder paint as described in claim 2, wherein the terminal carboxyl group content of said polyester is obtained by mixing a molten polyester, obtained by adding a polycarboxylic anhydride to the hydroxy groups contained therein, and a polycarboxylic anhydride-free polyester.

4. The polyester resin composition for a powder paint as described in claim 2, wherein said hexaalkoxymethylmelamine is represented by the following structural formula;

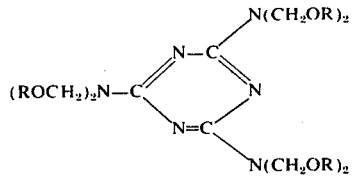

wherein R represents an alkyl group having not more than 6 carbon atoms.

5. The polyester resin composition for a powder paint as described in claim 1, wherein said hardener is mixed at temperatures less than 150°C.

* * * * *